(12) United States Patent
Elhage

(10) Patent No.: US 10,587,821 B2
(45) Date of Patent: Mar. 10, 2020

(54) HIGH SPEED IMAGE REGISTRATION SYSTEM AND METHODS OF USE

(71) Applicant: LOCKHEED MARTIN CORPORATION, Bethesda, MD (US)

(72) Inventor: Alexander M. Elhage, Endicott, NY (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 8 days.

(21) Appl. No.: 15/982,404

(22) Filed: May 17, 2018

(65) Prior Publication Data

US 2019/0356864 A1 Nov. 21, 2019

(51) Int. Cl.
*H04N 5/265* (2006.01)
*H04N 5/445* (2011.01)
*G06T 7/246* (2017.01)
*G06T 7/33* (2017.01)

(52) U.S. Cl.
CPC .......... *H04N 5/265* (2013.01); *G06T 7/248* (2017.01); *G06T 7/33* (2017.01); *H04N 5/44504* (2013.01); *G06T 2207/20221* (2013.01)

(58) Field of Classification Search
CPC ...... H04N 5/265; H04N 5/44504; G06T 7/33; G06T 7/248; G06T 2207/20221
See application file for complete search history.

(56) References Cited

U.S. PATENT DOCUMENTS

| | | | |
|---|---|---|---|
| 6,292,593 B1 * | 9/2001 | Nako | G06T 5/006 382/284 |
| 8,600,194 B2 | 12/2013 | Doepke | |
| 2003/0107586 A1 * | 6/2003 | Takiguchi | G06T 3/4038 345/629 |
| 2007/0237356 A1 * | 10/2007 | Dwinell | B07C 3/14 382/101 |
| 2010/0309308 A1 * | 12/2010 | Saphier | G06T 7/0004 348/92 |

(Continued)

OTHER PUBLICATIONS

Stathopoulou et al."Prior Knowledge About Camera Motion for Outlier Removal in Feature Matching", Computer Vision and Remote Sensing, International Conference on Computer Vision Theory and Applications, 2015, 8 pages.

*Primary Examiner* — Timothy J Henn
(74) *Attorney, Agent, or Firm* — Michael A. Minter; Andrew M. Calderon; Roberts Calderon Safran & Cole, P.C.

(57) ABSTRACT

The invention is directed to systems and methods for image capturing technologies and, more particularly, to a high speed image registration system and respective processes to achieve high quality images. The method is implemented in a computing device and includes: capturing a first image of an object and identifying interest points; capturing a second image of the object and identifying regions of interest associated with the identified interest points of the first image, in addition to any areas not captured in the first image; identifying interest points in the second image within the regions of interest of the second image; matching interest points between the first image and the second image; aligning the matched interest points between the first image and the second image; and blending together the first image and the second image using the aligned similar interest points to form a single image of the object.

18 Claims, 4 Drawing Sheets

(56) References Cited

U.S. PATENT DOCUMENTS

| | | | |
|---|---|---|---|
| 2013/0208997 A1* | 8/2013 | Liu | G06T 3/20 |
| | | | 382/284 |
| 2015/0294490 A1* | 10/2015 | Lin | G06T 7/40 |
| | | | 382/195 |
| 2018/0005392 A1* | 1/2018 | Gao | G06T 7/337 |
| 2018/0040150 A1* | 2/2018 | Saporetti | G06T 11/60 |
| 2018/0124380 A1* | 5/2018 | Berthilsson | H04N 1/00 |
| 2018/0211373 A1* | 7/2018 | Stoppa | G06T 7/55 |
| 2018/0268256 A1* | 9/2018 | Di Febbo | G06T 7/246 |
| 2018/0330472 A1* | 11/2018 | Elhage | G06T 3/4038 |

* cited by examiner

HIGH SPEED IMAGE REGISTRATION SYSTEM AND METHODS OF USE

FIELD OF THE INVENTION

The invention is directed to systems and methods for image capturing technologies and, more particularly, to a high speed image registration system and respective processes to achieve high quality images.

BACKGROUND DESCRIPTION

In conventional image capture systems, often an object needs to be imaged which is too large to fit in a single frame of a camera. In such cases, image stitching is used to combine multiple images into a single, larger image. This process generally has two steps: registration and blending. Registration is the aligning of images in multiple different frames; whereas, blending is the combining of the images into a single, high quality photograph. In the general image stitching problem, the relationship between any two images is not necessarily well known resulting in a computationally expensive registration step. Often, a brute force approach is taken which searches all possible alignments between two images.

With the above noted, image capture systems for postal sorting using continuously moving conveyor belts require multiple frames to capture a single object (mail label), which are then stitched together. In the case of a slice scan camera used in postal sorting, the image stitching process must occur dozens of times for each package or mailpiece. For example, in the postal system application, stitching is required due to the fact that the object to be captured, e.g., mail piece, is larger than the field of view of a camera; that is, an entire object (e.g., mailpiece) of interest cannot be captured in a single frame. Additionally, aligning and blending of the images is a process intensive technique which is often performed in post-processing steps. Accordingly, it is difficult to provide the captured image in real-time applications or as quickly as possible to perform the needed analysis.

In a more specific example, the conventional approach to image registration between two images includes the following steps:

(i) Points of interest are detected throughout the first image using an algorithm such as Harris Corner Detection;

(ii) For each point of interest, a descriptor is extracted which describes that point such that it can be matched with the same physical point captured in a different image;

(iii) Points of interest are detected throughout the second image using an algorithm such as Harris Corner Detection;

(iv) Descriptors are extracted for each point of interest in the second image;

(v) Each descriptor in the first image is attempted to be matched to every other descriptor in the second image. For each descriptor, the best match above a certain threshold of similarity is kept; and (vi) Matching points are used to estimate a transformation which will make the second image align with the first image.

However, using the conventional image registration approach has at least two primary issues. For example, first, inaccurate image registration is commonplace, i.e., it is possible for the image registration to produce entirely erroneous results. This is a particular issue when performing image registration on images containing mostly text, in which the same feature (character) may be seen repeated multiple times in the image. Second, there is unnecessary computations, which requires intensive processing power. This is due to the fact that each image requires detection of each point of interest, which then has to be matched with the points of interest of another image.

SUMMARY OF THE INVENTION

In an aspect of the invention, a method implemented in a computing device, comprises: capturing a first image of an object and identifying interest points; capturing a second image of the object and identifying regions of interest associated with the identified interest points of the first image, in addition to any areas not captured in the first image; identifying interest points in the second image within the regions of interest of the second image; matching interest points between the first image and the second image; aligning the matched interest points between the first image and the second image; and blending together the first image and the second image using the aligned similar interest points to form a single image of the object.

In yet another aspect of the invention, a computer program product comprises program code embodied in a computer-readable storage medium. The program code is readable/executable by a computing device to perform the following steps: identifying corner points in a first captured image of an object; identifying regions of interest in a second captured image of the object which correspond with the corner points of the first captured image; identifying corner points in the second image within the regions of interest of the second image; aligning matched corner points between the first image and the second image; and blending together the first image and the second image using the aligned matched corner points to create a single image of the object.

In still yet another aspect of the invention, a system comprises: a CPU, a computer readable memory and a computer readable storage medium; and program instructions to perform the method steps of recited in claim 1. The program instructions are stored on the computer readable storage medium.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

Figure 5:
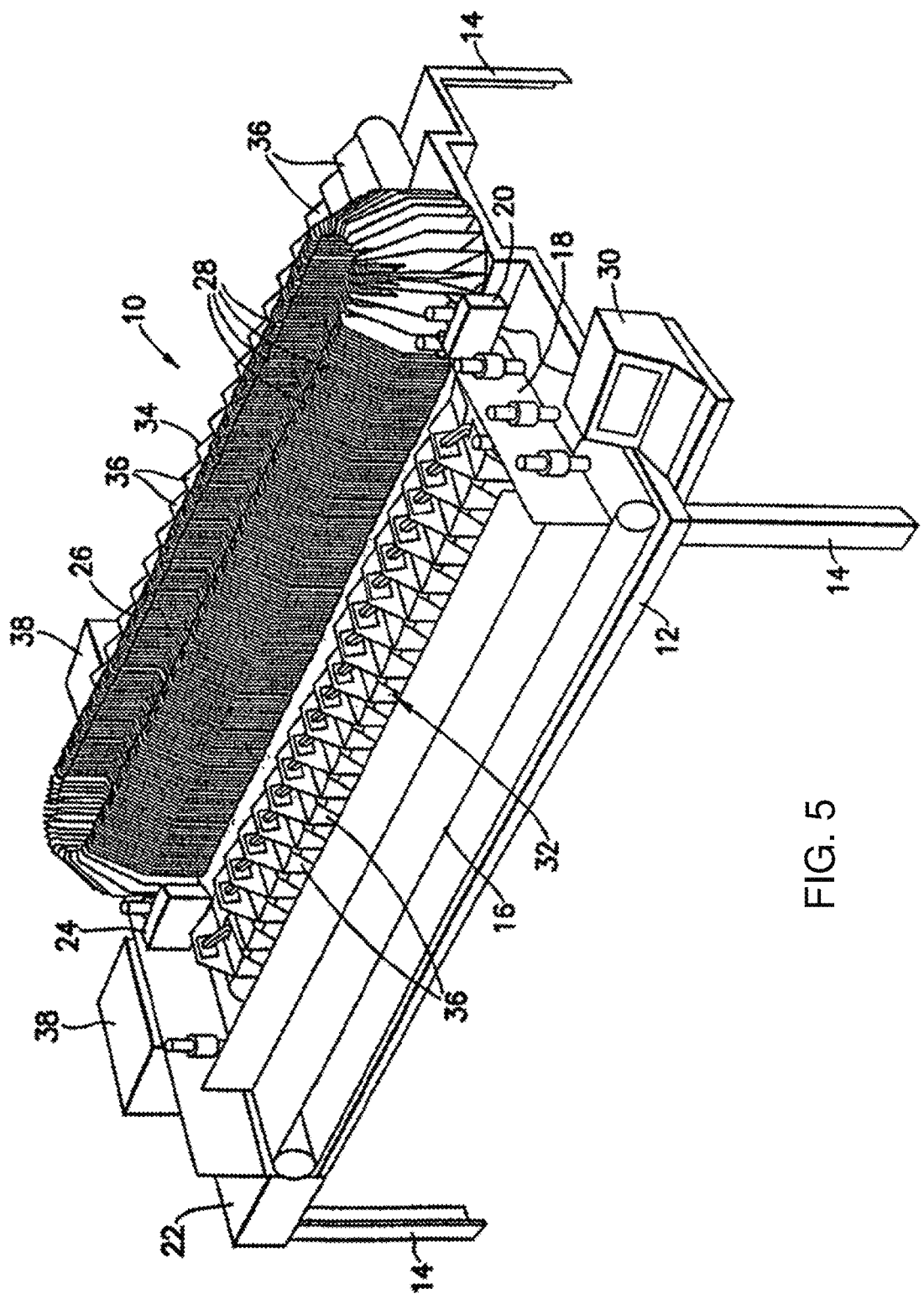
FIG. 5 shows an illustrative mail sorting and sequencing system, which can be used in implementing the processes of the present invention.

The invention is directed to systems and methods for image capturing technologies and, more particularly, to a high speed image registration system and respective processes to achieve high quality images. The high speed image registration system described herein provides an approach to increase the speed and accuracy of image registration by using the approximate relative motion between the camera and object being captured. The high speed image registration system described herein is particularly useful for postal system applications which use a "slice scan" camera and an object moving past the camera. As should be understood by those of skill in the art, a slice scan camera is used to capture very narrow frames (slices comprising multiple lines) as the object, e.g., mailpiece, moves past the camera as it travels through a mail sorting and/or sequencing system (as shown in FIG. 5 as an example). Additionally, while the invention is particularly useful for the "slice scan" camera since it requires capturing a large number of frames (and therefore a large number of image registration steps, which is a slow process), it will still provide the same performance benefits when used with conventional frame cameras.

More specifically, the high speed image registration system described herein differs from the conventional image registration approach in that the present approach uses, amongst other things, a priori information about the relative motion of the object and camera. This allows the current approach to, e.g., limit the region of each image which is searched for corner points (or other points of interest), constrain the number of potential matches for each corner point detected, and prevent the calculation of descriptors for corner points which do not have a feasible match based on motion information. Combined, these attributes result in a more computationally efficient image registration process with a highly constrained potential errors.

Accordingly and advantageously, by implementing the high speed image registration system using the motion of the object, it makes it more likely to produce accurate results, and inaccurate results being constrained to still be nearly correct. Moreover, the high speed image registration system described herein limits the area to search for corner points, limits the feature descriptors which are extracted at corner points, and limits the descriptors which are compared to one another. As a result, the stitching process can be performed more quickly (compared to conventional systems) in order to support real-time or near real-time stitching applications.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage having computer-readable program code embodied in computer-readable storage medium (non-transitory medium). The computer-readable storage medium can contain or store information for use by or in connection with the instruction execution system, apparatus, or device. The computer-readable storage medium may be, for example, an electronic, magnetic, optical, electromagnetic, infrared, or semiconductor system, apparatus, or device or other non-transitory medium, memory, device or system.

More specific examples of the computer-readable storage medium would include the following non-transitory systems, devices and/or memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, the computer readable storage medium, memory, system and/or device is not to be construed as being transitory signals per se. Hereinafter, the computer readable storage medium, memory, system and/or device is generally referred to as computer readable storage medium.

Figure 1:
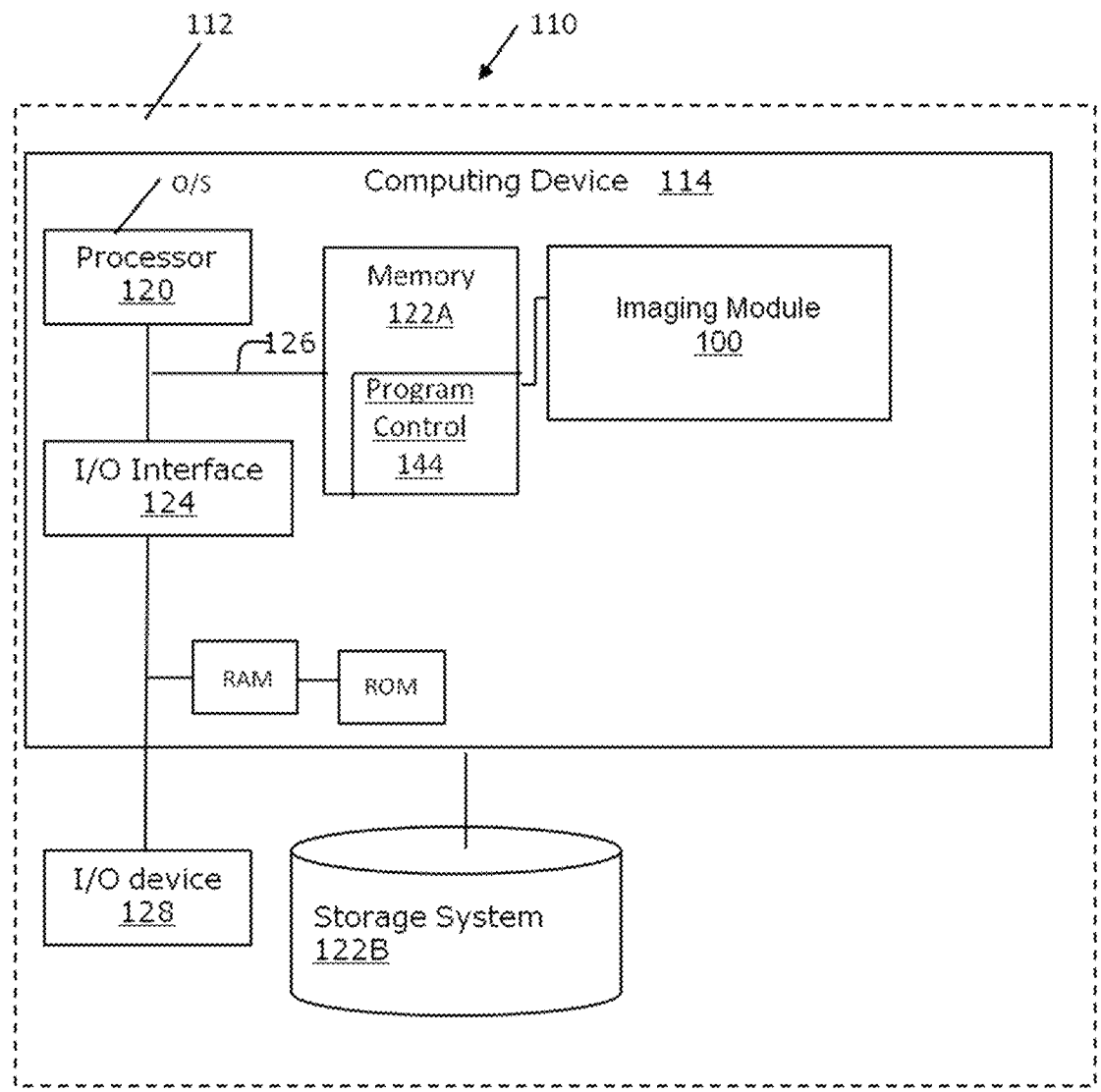
FIG. 1 shows an illustrative environment for implementing the steps in accordance with aspects of the invention.

FIG. 1 shows an illustrative environment 110 for managing the processes in accordance with the invention. The environment 110 includes a server or other computing system 112 that can perform the processes described herein. In embodiments, the illustrative environment may be used in a mail sorting and sequencing system as shown illustratively in FIG. 5; although other sorting and sequencing systems are also contemplated by the present invention. The computing system 112 includes a computing device 114 which can be resident on or communicate with a network infrastructure or other computing devices.

The computing device 114 includes a processor 120, memory 122A, an I/O interface 124, and a bus 126. In addition, the computing device 114 includes random access memory (RAM), a read-only memory (ROM), and an operating system (O/S). The computing device 114 is in communication with an external I/O device/resource 128 and the storage system 122B. The I/O device 128 can comprise any device that enables interaction with the computing device 114 (e.g., user interface) or any device that enables the computing device 114 to communicate with one or more other computing devices using any type of communications link or any device that enables the computing device 114 to interact with its environment. By way of example, the I/O device 128 can be a "slice scan" camera which captures multiple lines of an image in a single slice and captures multiple slices of the image representative of an object, e.g., mailpiece, as the object is traveling through a mail sorting and/or sequencing system shown in FIG. 5 as an example.

The processor 120 executes computer program code (e.g., program control 144), which can be stored in the memory 122A and/or storage system 122B. While executing the computer program code, the processor 120 can read and/or write data to/from memory 122A, storage system 122B, and/or I/O interface 124. The program code 144 executes the processes of the invention such as, for example, corner detection, descriptor extraction and descriptor matching for stitching and blending (transforming) together multiple images, e.g., as the object travels through a sorting and/or sequencing system at high speeds, amongst other features described herein.

The computing device 114 includes a imaging module 100, which can be implemented as one or more program code in the program control 144 stored in memory 122A as a separate or combined module. Additionally, the imaging module 100 may be implemented as separate dedicated processors or a single or several processors to provide the functionality of this tool. Moreover, it should be understood by those of ordinary skill in the art that the imaging module 100 is used as a general descriptive term for providing the features and/or functions of the present invention, and that the imaging module 100 may comprise many different components such as, for example, the components and/or infrastructure described and shown with reference to FIG. 1.

In embodiments, the imaging module 100 is operative and/or configured to, e.g., provide higher quality images of a mailpiece by detecting points of interest, extracting and matching descriptors (associated with the points of interest) and transforming and blending several different frames of an object into a single image. More specifically, the imaging module 100 identifies key points in common between two frames (e.g., two images of the object passing the camera) and then calculates the transformation which will best align each frame with the previous image. In embodiments, the imaging module 100 takes into consideration both the capture rate of the camera, e.g., the rate in which the camera captures an image of the object, and the known or best estimate of a speed of the object (e.g., mailpiece) as it passes the camera.

For example, based on prior knowledge of the motion (speed) of the object relative to the camera and the capture rate of the camera, the location of corners or other interest points of the first image in the first frame can be predicted in the second frame captured by the camera. Using this information, the imaging module 100 will select regions of interest (ROI) defined by the areas which are near the predicted locations of corners (or other interest points) from the first frame, in addition to any regions which were newly uncovered by the relative motion of the object as represented in the second image.

The imaging module 100 will then detect each corner or interest point of the second image in the regions of interest and make matches to the features of interest to the first image. Feature descriptors are extracted and stored only for corners (or interest points) which have a potential match between the first image and the second image. The feature descriptors of potential matches are compared for similarity and the matches which have descriptors within some predetermined threshold of each other will be recognized as an actual match between the two frames. In embodiments, the threshold is a configurable parameter. For example, in practice, this value will be tuned for each particular implementation of this invention as the optimal value is going to depend on the many factors which affect image quality such as lighting, how fast the object is moving, and the camera hardware as should be understood by those skilled in this field. The matches are then used to approximate the transformation which needs to be applied to the second frame in order to align with the first frame. This process is then repeated as each new frame arrives.

Once the transformation for all frames has been calculated they are transformed and blended into a single image by the imaging module 100. In this way, the imaging module 100 can stitch together multiple slices of an image of a mailpiece or text of a mailpiece or other object, in real-time with less processing power (compared to conventional systems). Also, the imaging module 100 can correct for any rocking motion of the object between frames.

Implementations

FIGS. 2A-4 show representations of different techniques (processes) implemented by the systems and processes described herein. These figures can also represent exemplary flows for respective processing steps in accordance with aspects of the present invention. The exemplary representations can be implemented as a system, a method, and/or a computer program product and related functionality implemented on the computing system of FIG. 1. Accordingly, the processes associated with each representative figure can be implemented by special purpose hardware-based systems that perform the specified functions or acts or carry out combinations of special purpose hardware and computer instructions. It is also contemplated that any combination of techniques described herein can be used together in parallel or serially.

Corner Detection of First Image

Figure 2A:
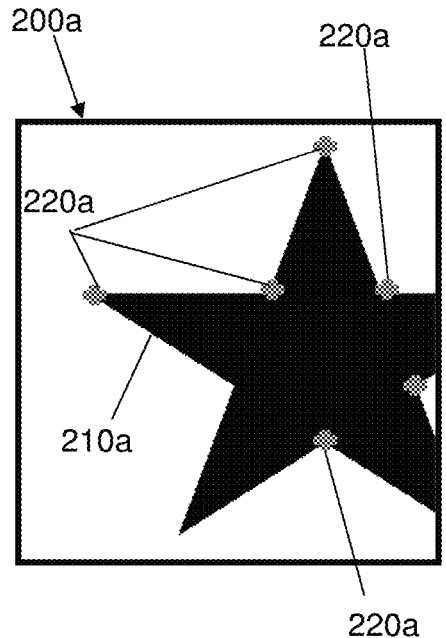
FIG. 2A shows a representation of a corner detection technique performed on a first image in accordance with aspects of the present invention.

FIG. 2A shows a representation of a corner detection technique performed on a first image in accordance with aspects of the present invention. More specifically, as shown in FIG. 2A, in a first frame 200a, a slice of an object or first image 210a, e.g. star, is captured by an imaging system (image registration system) such as a "slice scan" camera (although a conventional frame camera is also contemplated herein). As previously noted, in embodiments, the "slice scan" camera is used to capture very narrow frames (slices comprising multiple lines) as the object moves past the camera.

In embodiments, the image registration system will search the entire first frame 200a of the image 210a for interest points 220a. In embodiments, the interest points 220a can be corner points of the image 210a found using a corner detection algorithm such as Harris Corner Detection. As should be understood by those of skill in the art, corner detection is an approach used within computer vision systems to extract certain kinds of features and infer the contents of an image.

It should also be understood that a corner can be defined as the intersection of two edges. A corner can also be defined as a point for which there are two dominant and different edge directions in a local neighborhood of the point. On the other hand, an interest point is a point in an image which has a well-defined position and can be robustly detected. This means that an interest point can be a corner but it can also be, for example, an isolated point of local intensity maximum or minimum, line endings, or a point on a curve where the curvature is locally maximal, as examples.

Determining Regions of Interest of a Second Image

Figure 2B:
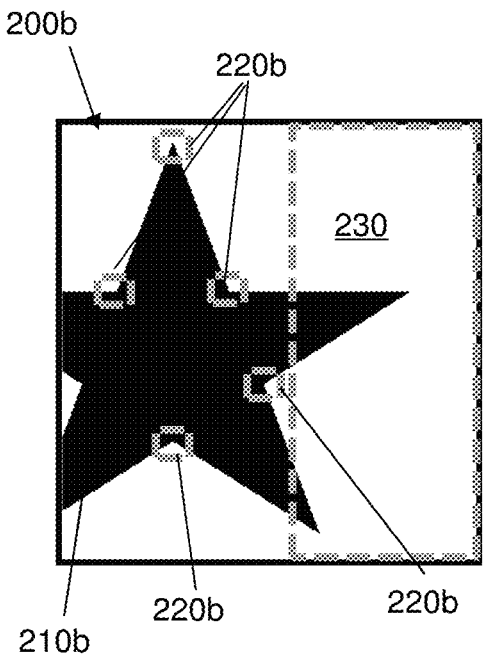
FIG. 2B shows a representation of identifying regions of interest of a second image of the object in accordance with aspects of the present invention.

FIG. 2B shows a representation of regions of interest of a second image of the object in accordance with aspects of the present invention. More specifically, as shown in FIG. 2B, based on knowledge of the motion of the object relative to the camera and the capture rate of the camera, the location of the corners or other interest points 220a of FIG. 1 can be predicted or defined in the next frame 200b and defined as regions of interest 220a. More specifically, based on the known or estimated travel speed (motion) of the object with respect to the camera and the capture rate of the camera, regions of interest (ROIs) 220b of the second image 210b can be defined by the areas which are near the predicted locations of corners 220a (or interest points) from the previous frame 200a. In addition, in the next frame 200b, any regions which were newly uncovered, i.e., not in the first frame 200a, can also be defined as a regions of interest 230.

By way of example, assuming that the motion of the object (mailpiece) on a conveying system is 10 feet/second and the capture rate of the camera is two (2) pictures/second, the object will be calculated as having traveled five (5) feet between each picture (capture). Using this information, it is now possible to predict an approximate location of the corners or other interest points 220a of the first image 210a in the second image 210b, now defined as regions of interest 220b. It is noteworthy to mention that by implementing this process, the regions of interest 220b, 230 are significantly smaller than the entire image 210b or frame 200b.

Corner Detection in Region of Interest

Figure 3:
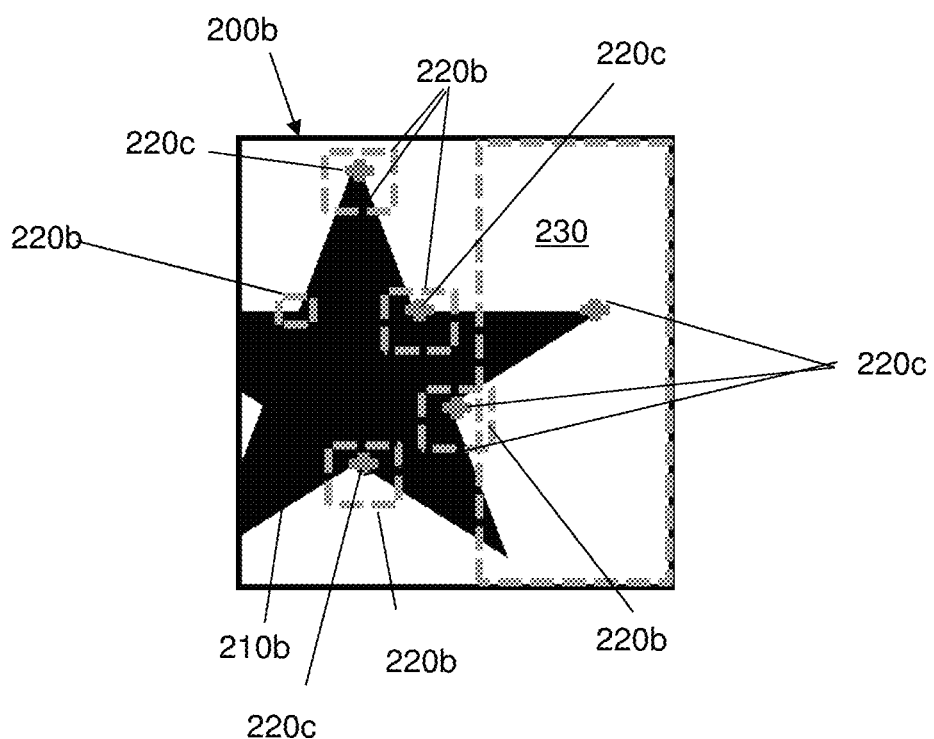
FIG. 3 shows a representation of a corner detection technique on the second image in the regions of interest shown in FIG. 2B, in accordance with aspects of the present invention.

FIG. 3 shows a representation of a corner detection technique of the second image in the regions of interest shown in FIG. 2B, in accordance with aspects of the present invention. In FIG. 3, corner points of the image 210b are found within the regions of interest 220b using a corner detection algorithm such as Harris Corner Detection. More specifically, each corner detected in the second image 210b in the regions of interest 220b (which were predicted to contain corners based on the first image 210a) are considered potential matches with the corresponding corners (or other interest points) in the first image 210. These potential matches are then subjected to a corner detection algorithm; that is, the corner detection algorithm is run only in the regions of interest 220b defined by the areas which are near the predicted locations of corners from the previous frame 200a (of FIG. 1), in addition to any regions 230 which were newly uncovered 230 by the relative motion of the object to the camera. The corner points or other interest points that are found in the regions of interest 230, 220b are then marked as representatively shown by reference numeral 220c.

Note that other than for the first frame 200a, only a small portion of each frame 200b (and any successive frames) is searched for corner points or other common interest points (in the defined regions of interest). Accordingly, a significant savings in computationally expensive registration steps can be achieved due to the significantly reduced areas of interest, compared to conventional systems.

Descriptor Extraction and Matching (Aligning and Blending)

Figure 4:
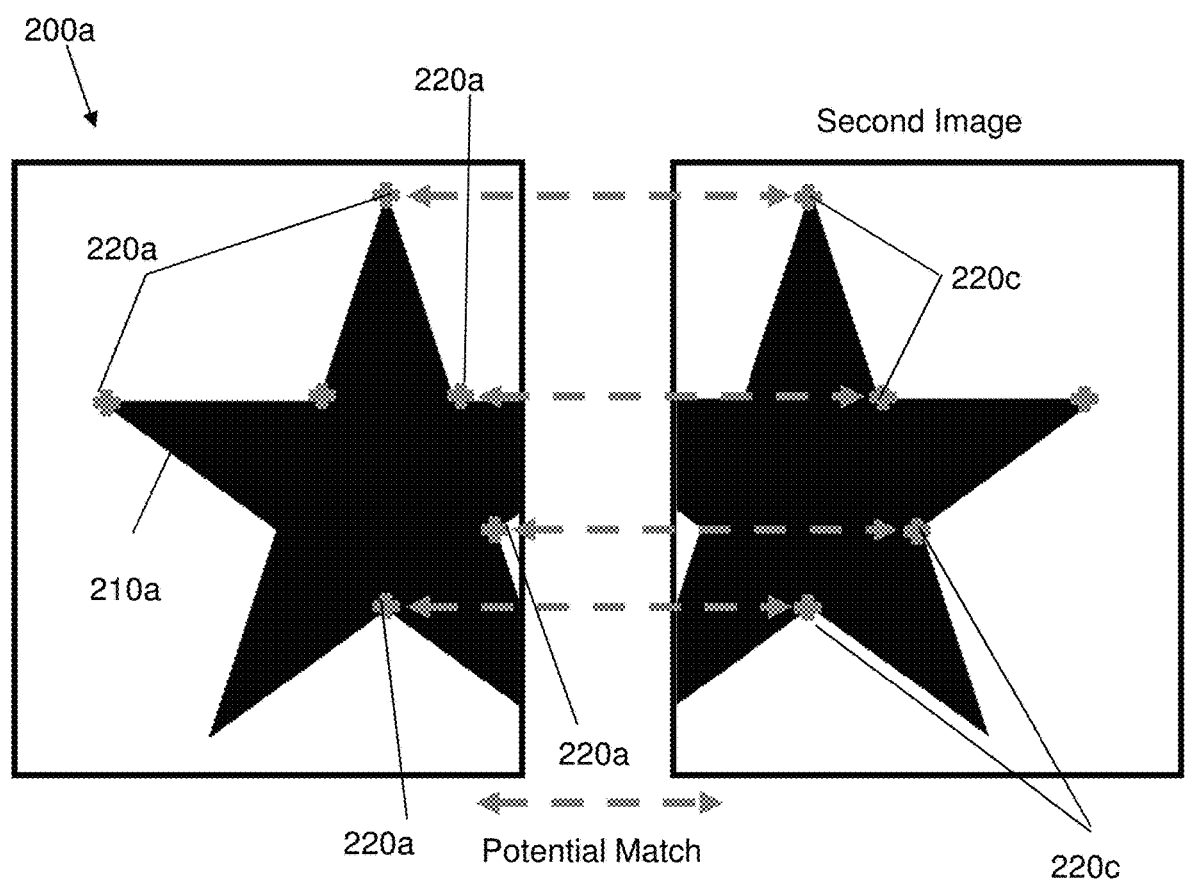
FIG. 4 shows a representation of a descriptor extractor and matching techniques, between the first image and the second image in accordance with aspects of the invention.

FIG. 4 shows a representation of a descriptor extractor and matching techniques, between the first image and the second image in accordance with aspects of the invention. For example, FIG. 4 representatively shows feature descriptors extracted from the second image 200b and stored only for corners 220c which have a potential match with a corner 220a in the first or previous frame 200a. In embodiments, the potential matches will be more closely examined using a feature descriptor algorithm such as BRIEF or FREAK, which are algorithms that calculate a representation of a corner that is unique to the real world object that is captured.

As should be understood by those of skill in the art, BRIEF is a general-purpose feature point descriptor that it based on comparison and which can be combined with arbitrary detectors. FREAK, on the other hand, generates a hierarchical descriptor allowing early out comparisons. FREAK significantly reduces the number of necessary compare operations. Accordingly, when the same corner on the same physical object are captured in multiple frames, these algorithms produce a very similar representation of the corner in both frames, 200a, 200b. From here, the similar points of interest 220c which are found between the frames 200a, 200b can be identified and extracted.

Accordingly, the image registration system attempts to align successive frames by looking for key points in common between the two frames 200a, 200b and then calculates the transformation which will best align each frame with the previous one. For example, the feature descriptors of potential matches 220c, 220a shown in FIG. 4 are compared for similarity. The matches which have descriptors within a predetermined threshold of each other are recognized as an actual match between the two frames. Note that descriptors are only compared for corners which are predicted to represent the same point based on the known approximate relative motion of the object. The matches are then used to approximate the transformation which needs to be applied to the second frame 200b in order to align with the first frame 200a. This process is then repeated as each new frame arrives.

The processes continue using known aligning and blending techniques such that no further explanation is required for an understanding of the present invention. For example, the similar points of interest (e.g., interest points 220a, 220c) found between the first image 210a and second image 210b are aligned and blended together using the aligned similar points of interest.

In the case where not enough corners are detected in the second frame 200b to estimate the transformation, the image (e.g., images 210a, 210b) is transformed based on the motion of the object only. Once the transformation for all frames has been calculated they are transformed and blended into a single image for processing as is known in the art. In embodiments, only two matches between two successive frames are needed in order to calculate the transformation needed to align the frames. For example, the absolute minimum number of matches required to align frames would be two matches in order to perform what is called a 'similarity transformation'. In general, however, the accuracy of the transformation will increase with a greater number of matches, so it is desirable to have more than two matches.

Accordingly, by implementing the systems and processes described herein, it is now possible for the image registration system to produce entirely accurate results. This is a particular useful and beneficial when performing image registration on images containing mostly text, in which the same feature (character) may be seen repeated multiple times in the image. This is due to the fact that the systems and processes described herein are capable of estimating the position of the mailpiece as it is conveyed through the system and, hence, can determine the positions/locations of duplicative characters. In addition, unnecessary computations are eliminated due to the fact that it is no longer necessary for each image to require detection at each point of interest; instead, the systems and processes described herein significantly limits the region of each image which is searched for corner points, constrain the number of potential matches for each corner point detected and prevents the calculation of descriptors for corner points which do not have a feasible match. Combined, these attributes result in a more computationally efficient image registration process with a highly constrained potential errors.

Illustrative Sorting and Sequencing System

FIG. 5 shows an illustrative mail sorting and sequencing system, which can be used with the processes of the present invention. It should be understood by those of skill in the art that the present invention can be implemented with any number of mail sorting and sequencing systems, and that the illustrative representation of the mail sorting and sequencing system of FIG. 5 should not be considered a limiting feature to the claimed invention.

As shown in FIG. 5, the mail sorting and sequencing system is a single pass carrier delivery sequence sorter generally indicated by the numeral 10. The single pass carrier delivery sequence sorter 10 has a base 12 with four legs 14 (only three shown in FIG. 5) extending therefrom. An auto feed station 16 extends lengthwise along the base 12 and has a feeder 18 and an address reader 20 at one end and a manual feed station 22 with a second address reader 24 at the other end. The feeder 18 and address reader 20 create a feed, read and insert path to a racetrack sorting device 26 which has an array of bin dividers 28, adjacent ones of which create holders for individual mail pieces deposited therebetween. A video encoder/numerical controller 30 which may be a microprocessor or the like is located adjacent the feeder 18 and operationally connected to various components of the single pass carrier delivery sequence sorter 10 for coordinating the operation of the same in a manner explained. In embodiments, the address readers 20, 24 and/or video encoder/numerical controller 30 or other computing devices can read barcode information and implement the processes of the present invention. On either side of the racetrack sorting device 26 are two interim unloading station units generally indicated by the numeral 32, each having twenty (20) interim unloading stations 36. At the ends of the interim unloading station units 32, bundling/wrapping stations 38 are mounted on the base 12. See, e.g., U.S. Pat. No. 8,138,438, for a full detailed explanation of the single pass carrier delivery sequence sorter 10 and related systems, the contents of which are incorporated by reference in their entirety herein.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A method implemented in a computing device, comprising:
   capturing a first image of an object and identifying interest points;
   capturing a second image of the object and identifying regions of interest associated with the identified interest points of the first image, in addition to any areas not captured in the first image;
   identifying interest points in the second image within the regions of interest of the second image;
   matching interest points between the first image and the second image;
   aligning the matched interest points between the first image and the second image;
   blending together the first image and the second image using the aligned similar interest points to form a single image of the object; and
   using a travel speed of the object as it passes a camera to predict the interest regions associated with the identified points of interest of the first image.

2. The method of claim 1, further comprising using a capture rate of the camera to predict the regions of interest associated with the identified interest points of the first image.

3. The method of claim 2, wherein the interest points of the first image and the second image are corners of the first image and the second image.

4. The method of claim 2, further comprising extracting descriptors of the matched similar interest points of the second image.

5. A method implemented in a computing device, comprising:
   capturing a first image of an object and identifying interest points;
   capturing a second image of the object and identifying regions of interest associated with the identified interest points of the first image, in addition to any areas not captured in the first image;
   identifying interest points in the second image within the regions of interest of the second image;
   matching interest points between the first image and the second image;
   aligning the matched interest points between the first image and the second image;
   blending together the first image and the second image using the aligned similar interest points to form a single image of the object; and
   searching an entire first frame of the first image for the interest points.

6. The method of claim 5, wherein the identifying the interest points of the second image comprises searching only the regions of interest of the second image to find the interest points of the second image associated with the interest points of the first image.

7. The method of claim 6, wherein the regions of interest of the second image associated with the identified interest points of the first image are predicted based on a known or estimated travel speed of the object as it passes a camera and a capture rate of the camera.

8. The method of claim 7, wherein the regions of interest associated with the identified interest points of the first image encompasses an area smaller than an entirety of the first image or the second image.

9. A computer program product comprising program code embodied in a non-transitory computer-readable storage medium, the program code is readable/executable by a computing device to perform the following steps:
   identifying corner points in a first captured image of an object;
   identifying regions of interest in a second captured image of the object which correspond with the corner points of the first captured image;
   identifying corner points in the second image within the regions of interest of the second image;
   aligning matched corner points between the first image and the second image; and
   blending together the first image and the second image using the aligned matched corner points to create a single image of the object,
   wherein the regions of interest are predicted based on a known or estimate travel speed of the object as it passes a camera and a capture rate of the camera.

10. The computer program product of claim 9, wherein the corners points of the first image substantially match to the corner points of the second image in the regions of interest.

11. The computer program product of claim 10, further comprising extracting descriptors of the corner points in the second image.

12. A computer program product comprising program code embodied in a non-transitory computer-readable storage medium, the program code is readable/executable by a computing device to perform the following steps:
   identifying corner points in a first captured image of an object;

identifying regions of interest in a second captured image of the object which correspond with the corner points of the first captured image;

identifying corner points in the second image within the regions of interest of the second image;

aligning matched corner points between the first image and the second image;

blending together the first image and the second image using the aligned matched corner points to create a single image of the object; and searching an entire first frame of the first image for the corner points and only the regions of interest in the second frame for the corner points.

13. The computer program product of claim 12, wherein the regions of interest in the second frame include areas that were not captured by a camera in the first frame.

14. The computer program product of claim 13, wherein the regions of interest associated with second image is an area smaller than the first image.

15. The computer program product of claim 13, wherein the regions of interest associated with second image is an area smaller than the second image.

16. A system comprising:

a CPU, a computer readable memory and a computer readable storage medium; and program instructions to perform the method steps of claim 1;

wherein the program instructions are stored on the computer readable storage medium.

17. The system of claim 16, wherein the identifying the interest points of the second image comprises searching only the regions of interest of the second image.

18. A system comprising:

a CPU, a computer readable memory and a computer readable storage medium; and program instructions to perform:

capturing a first image of an object and identifying interest points;

capturing a second image of the object and identifying regions of interest associated with the identified interest points of the first image, in addition to any areas not captured in the first image;

identifying interest points in the second image within the regions of interest of the second image;

matching interest points between the first image and the second image;

aligning the matched interest points between the first image and the second image; and blending together the first image and the second image using the aligned similar interest points to form a single image of the object, wherein the program instructions are stored on the computer readable storage medium, the identifying the interest points of the second image comprises searching only the regions of interest of the second image, and the regions of interest of the second image associated with the identified interest points of the first image are predicted based on a known or estimated travel speed of the object as it passes a camera and a capture rate of the camera.

* * * * *